S. J. HELLMAN.
MOTOR VEHICLE ANTITHEFT DEVICE.
APPLICATION FILED NOV. 1, 1916.
1,373,242.
Patented Mar. 29, 1921.
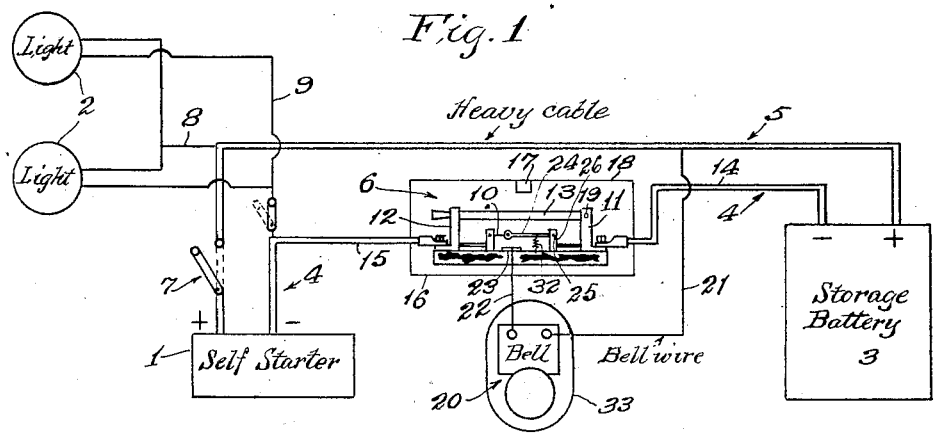
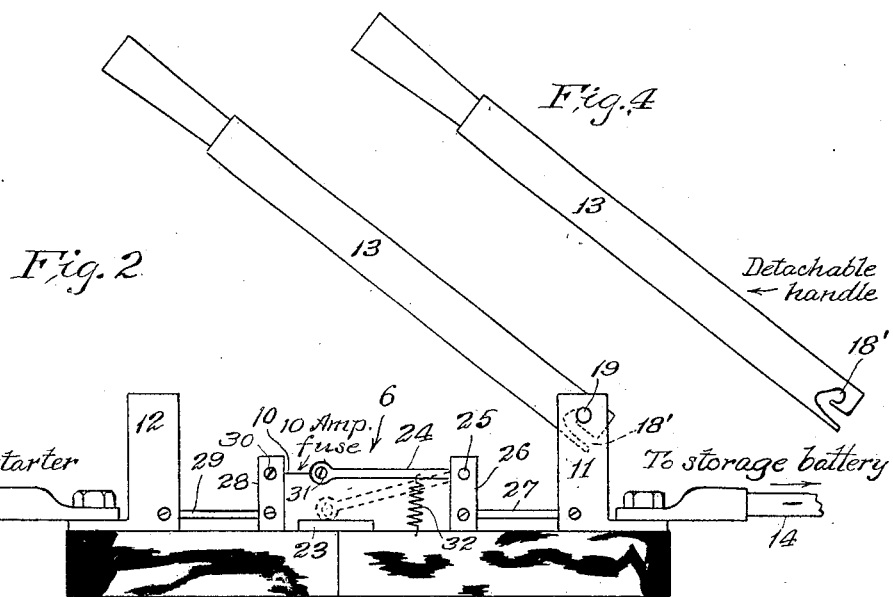
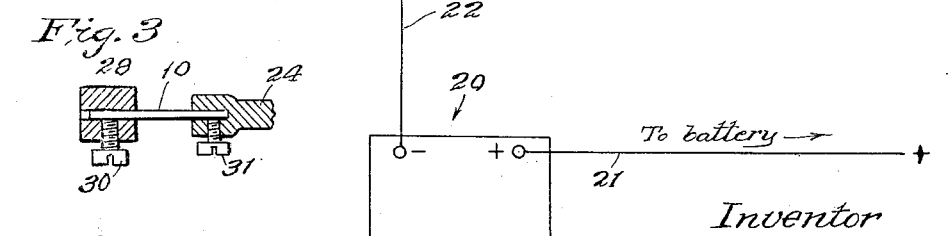
Witness
C. C. Holly.
Inventor
S. Jack Hellman
by James R. Townsend
his atty.

UNITED STATES PATENT OFFICE.

SAMUEL JACK HELLMAN, OF LOS ANGELES, CALIFORNIA.

MOTOR-VEHICLE ANTITHEFT DEVICE.

1,373,242.      Specification of Letters Patent.      Patented Mar. 29, 1921.

Application filed November 1, 1916. Serial No. 129,227.

*To all whom it may concern:*

Be it known that I, SAMUEL JACK HELLMAN, a citizen of the United States, residing at Los Angeles, in the county of Los Angeles and State of California, have invented a new and useful Motor-Vehicle Antitheft Device, of which the following is a specification.

An object of this invention is to provide cheap, simple, easily-installed means for application to automobiles or the like to increase the difficulty of stealing the same.

A further object is to increase the likelihood of catching motor vehicle thieves.

I regard the invention as broadly new and pioneer in that advantage is taken of the fact that in modern automobiles there are electric circuits adapted to carry currents of greatly different power, as for instance, a light circuit and a self-starter circuit, both of which circuits are connected to one and the same storage battery. The electric light circuit requires only a few amperes of current, usually about ten amperes, to keep the lamps of the machine lighted, but the self-starter circuit usually requires a current of about 250 amperes, more or less, for starting the engine, and in this invention I provide an electric switch capable of conducting the currents for both the self-starter and for the light, and I permanently connect the contact points of said switch through a fuse or other conductor adapted to conduct the current for the lights of the automobile and adapted to be melted by the current for the self-starter, and I also show an alarm to be set off whenever the fuse is melted.

Other objects and advantages may appear from the accompanying drawing, the subjoined detail description and the appended claims.

The accompanying drawings illustrate the invention.

Figure 1 is a diagrammatic illustration of the anti-theft device as it may be installed in a modern automobile, not shown, the parts being in normal or usual running position.

Fig. 2 is an enlarged diagrammatic elevation of the main non-fusible connection for the self-starter, the constant fusible shunt connection for the lighting system, and the alternative connection for the auxiliary signal.

Fig. 3 is a fragmental plan view of the shunt connection.

Fig. 4 is a side elevation of the main switch handle detached.

1 is an electrically-operated device, such as a self-starter, that is operable in connection with the starting of the vehicle motor. 2 represents the electrically-operated signal means which may consist of the usual automobile electric lamps. The main electric circuit for the starting device is shown as comprising a storage battery 3 and leads 4, 5 connected with the self-starting electric motor and having a switch in each lead between the starting device 1 and the electrical source 3. These switches are indicated in a general way by the characters 6 and 7. A shunt circuit is provided for the signal device 2. One limb 8 of said shunt circuit is connected to one lead 5 of the main circuit between its switch 7 and the electrical source 3. The other limb 9 of the shunt circuit is connected to the other lead 4 of the main circuit between its switch 6 and the starting device 1. The signal means 2 is connected in the shunt circuit and is operable by the current thereof. A shunt conductor 10 which is capable of carrying the current for the shunt circuit independently of the switch 6 between said electrical source and said shunt circuit, is fusible by the current required to operate the starting device.

The switch 6 may be of any suitable construction and is shown as a knife switch constructed with stationary poles or contacts 11, 12 and an adjustable blade 13 to connect between said contacts 11 and 12; the contact 11 being connected to the conductor 14 and the contact 12 being connected to the conductor 15 going to make up the lead 4. The switch 6 is capable of carrying the current for both the main and the shunt circuits, and when said switch is closed as shown in Fig. 1 the switch 7 for the starting device 1 may be closed, thus starting said starting device into operation, without in any way interfering with the lighting system or signal 2 of the vehicle; but if the switch 7 is closed while the switch 6 is open, the current for the starting device will immediately fuse the fusible conductor 10, thus breaking the circuit and extinguishing the lights 2, which when lighted serve as a signal that the vehicle is not in jeopardy but the extinguishment of which indicates that the vehicle is being tampered with.

The switch 6 may be applied to a self-starting system already installed in a modern automobile and the electrical connections can easily be made as suggested in the drawing, so that this invention can be readily applied to modern automobiles at very slight expense.

The fusible conductor 10 may be a common electrical fuse sufficient to conduct the current for the lighting system of the vehicle; or it may be a rod, bar or strip of lead of like conducting and fusing character, or it may be of any other suitable construction. The switch 6 will be concealed and may be secured against interference by means of a box 16 having a lock 17 for its lid 18, and when the owner of the vehicle desires to secure his machine against theft he will open the switch 6 and then lock the box. For greater security the blade 13 of the switch may be detachable as shown in dotted lines in Fig. 2 and in full lines in Fig. 4, there being an involved open notch 18 provided in the blade 13 to engage the pivot 19. The blade may be removed and concealed or carried away by the authorized person, thus interposing another difficulty in the way of the would-be thief.

For further security a second electrically-operated signal device 20 which may be an electric bell, horn, lamp or other suitable device is connected with the electric source 3 by a bell wire 21 that is connected to the lead 5 of the main circuit, the other pole of the electric bell being connected by bell wire 22 to an emergency contact 23 in the way of a movable conductor or shunt switch 24 that is made to contact with 23 when the fuse 10 is melted.

The fuse 10 of the shunt conductor is connected to normally support the conducting arm 24 that is pivotally mounted by pivot 25 on a conducting support 26 that is connected to the conductor 14 through the contact 11 of the switch 6 and a conductor 27. The other end of the fusible conductor 10 is connected to the conductor 15 through a support 28, conductor 29 and contact 12. The fuse 10 is secured to the support 28 and the arm 24 by binding screws 30 and 31 so as to be easily removable and renewable.

The arm 24 as shown is adapted to fall by gravity when the fuse 10 is melted and a spring 32 is connected to said arm to insure contact of the arm 24 with the contact 23 whenever the fuse is melted, irrespective of the position in which the switch 6 is arranged.

In case the emergency signal 20 is in the form of a bell it may be inclosed in a cage 33 to prevent being tampered with by the would-be thief.

In practical use when the switch 6 is open and the switch 7 is closed the fuse 10 immediately melts and the conducting arm 24 contacting with the contact 23 establishes a circuit that causes the signal 20 to incessantly give alarm until the arm 24 is raised to break the circuit.

It is evident that when switch 6 is open, any closing of the self-starter switch 7 without first closing the switch 6, will cause an alarm signal to be given.

At night-time the extinguishing of the lights serves as a signal to any observer that the vehicle is being tampered with and will startle the unauthorized person meddling with the machine, and will call for investigation by any officer who may be near. Furthermore, if, by any means, the would-be thief succeeds in starting the machine, he must run it without the usual lights, if at all, and will thus be subject to inquiry and to arrest for running an unlighted machine.

The switch 7 being open, the self-starter cannot be operated and the thief cannot start the engine without using a crank which he will not find as it will be concealed and locked up in the tool box 16 or elsewhere.

The main switch 6 being likewise concealed and locked up, the only alternative for moving the machine under its own power will be to furnish a crank to fit the machine.

It is understood that the main switch can be placed in the ignition circuit also so as to cut off the igniting current if further protection were desired, and the ignition circuit as well as those shown could be housed to protect against tampering; and therefore the invention is not limited to the specific circuits nor to the specific form of switch to be employed.

I claim:—

1. A motor vehicle anti-theft device comprising an electrically-operated device operable in connection with the starting of the vehicle motor; a source of electrical energy therefor, electrically-operated signal means; a main electric circuit for said starting device, said main circuit comprising leads connected to the electrical source and having a switch in each lead between the starting device and the electrical source; a shunt circuit, one limb of which is connected to one of said leads between its switch and the electrical source and the other limb of which is connected to the other lead of the main circuit between its switch and the starting device; signal means connected in the shunt circuit; and a shunt conductor capable of shunting the current for the shunt circuit around the switch between said electrical source and said shunt circuit when said switch is open; said shunt conductor being fusible by the current required to operate the starting device.

2. In an anti-theft device for motor vehicles, the combination with an electric source, of a main switch, a shunt switch, an electrically-operated device connected to said source through said main switch; a signal device connected to said source through said shunt switch; means whereby said main switch can be opened; and means to operate said shunt switch to automatically divert the current from said electrically-operated device to sound said signal device in case an attempt is made to operate said electrically-operated device when said main switch is open.

3. In an anti-theft device for motor vehicles, an electric switch comprising two contacts and detachable means to connect and disconnect said contacts; an electrical source; an electrically-operated device connected to said source through said switch; a signal device connected to said source through said switch; a fusible conductor electrically connecting said contacts to supply current to the signal device and fusible by the current for said electrically-operated device; and a switch for controlling the current for said electrically-operated device.

4. In an anti-theft device for motor vehicles, an electric switch comprising two contacts and detachable means to connect and disconnect said contacts; an electrical source; an electrically-operated device connected to said source through said switch; a signal device connected to said source through said switch; a fusible conductor and a pivoted conductor supported thereby, the same electrically connecting said contacts to supply current to the signal device the fusible conductor being fusible by the current for said electrically-operated device; a switch for controlling the current for said electrically-operated device; an alarm contact in the way of said pivoted conductor; an alarm device; and connections between the alarm device and the electrical source to operate the alarm device when the pivoted conductor contacts with said alarm contact.

5. In an anti-theft device for motor vehicles the combination with an electric source, of a main switch, a shunt switch, an electrically-operated device connected to said source through said main switch, a signal device connected to said source through said shunt switch; automobile lamps connected to said source through said switches; means whereby said main switch can be opened; and means to operate said shunt switch to automatically divert the current from said electrically-operated device and said lamps, to sound said signal device in case an attempt is made to operate said electrically-operated device when said main switch is open.

In testimony whereof, I have hereunto set my hand at Los Angeles, California, this 25th day of October, 1916.

S. JACK HELLMAN.

Witness:
JAMES R. TOWNSEND.